INVENTORS
FRANCIS L. RIGBY
WILLIAM E. PARKER
BY: Fetherstonhaugh & Co
ATTORNEYS

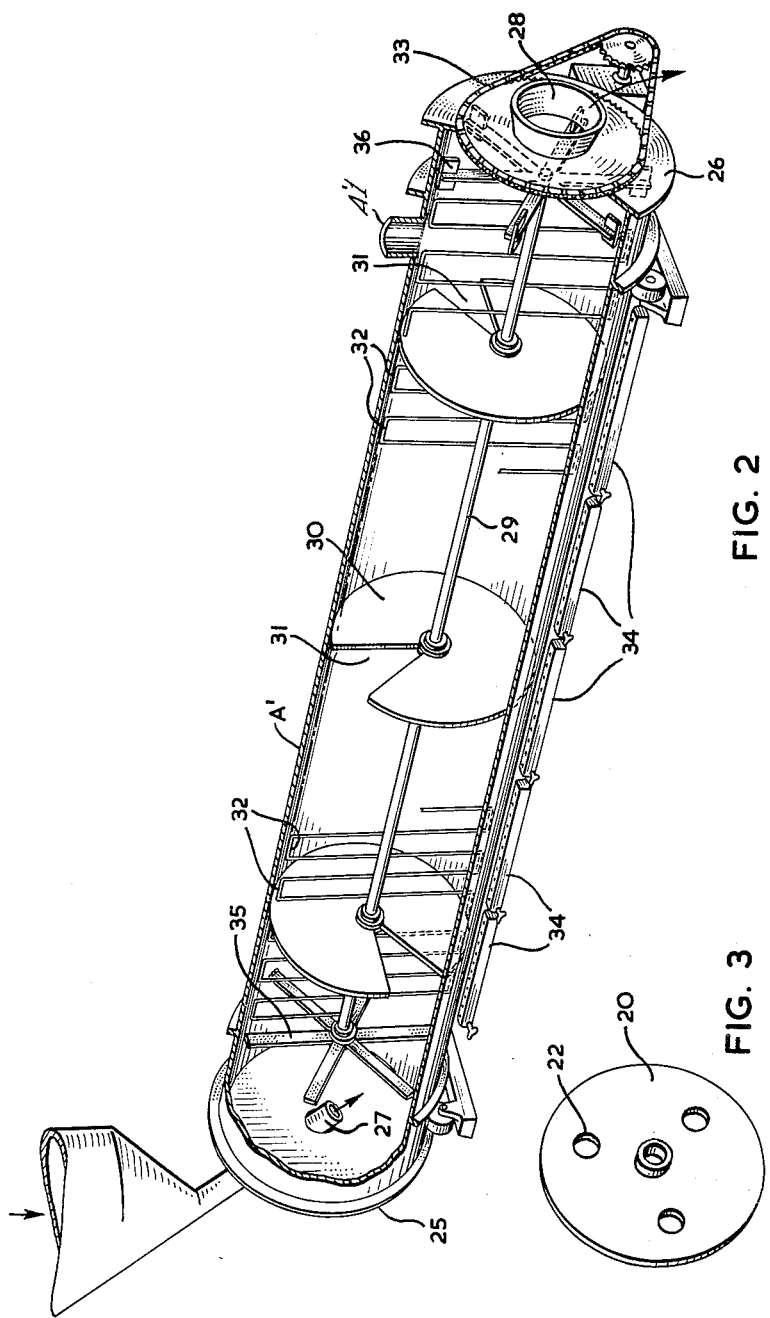

United States Patent Office 3,216,345
Patented Nov. 9, 1965

3,216,345
CONTINUOUS PREPARATION OF
BREWERS' MASH
Francis Lloyd Rigby, Scarborough, and William Ernest Parker, Toronto, Ontario, Canada, assignors to Canadian Breweries Limited, Toronto, Canada
Filed Apr. 9, 1962, Ser. No. 186,064
2 Claims. (Cl. 99—276)

This invention relates to the continuous preparation of brewers' mash.

It has previously been proposed to continuously prepare and supply brewers' mash but methods and apparatus proposed have material disadvantages. In one proposal, the formed mash is pumped through a long extent of small diameter tortuously arranged pipe, jacketed as required to vary temperature for conversion of the mash. Such process is useful only in the case of a very thick mash since, to maintain linearity of flow, the mash must move as a semi-solid mass. Because of poor heat conductivity of the mash, it is difficult to raise temperature uniformly through the cross-section of the tube. Moreover, capacity is severely limited as an increase in the diameter of the tube increases the problem of temperature change of the mass in the central core of the tube. Furthermore, this system is not flexible with respect to throughput since any change in throughput will be accompanied by a change in hold-up time with consequent changes in the composition of the resulting mash. Finally, because it employs a completely closed system, there is no opportunity for the escape of undesirable volatiles.

A further proposal is to carry out mashing in a vertical vessel divided into transverse zones by means of fixed baffles wherein each zone has a separate heating jacket and separate agitator. The mash pumped into the bottom of such vessel moves upward through the successive zones by displacement, receiving agitation in each zone before discharge at the top. This has a material disadvantage, that it will not produce true linear flow, i.e. of first material in, first material out, since some material entering the first zone will almost immediately be thrown to the exit by agitation, and some of the material entering the second zone will immediately pass into the third, whereas vigorous agitation necessary in each zone especially in the case of highly dilute mash to avoid any settling has the further disadvantage of breaking up the husk particles of the malt giving difficulty subsequently in the brewing process where the spent grains are separated from the wort. Moreover, such system has the further disadvantages of lack of flexibility in throughput if the same time-temperature program is maintained; it must be operated at full capacity as contrasted to occasions where it is desirable to operate at a throughput below maximum capacity; it is operable only as a "closed system" so that undesirable volatile compounds cannot escape to atmosphere; the size of each zone is reasonably fixed so that proportional variation of the total mash time at which the mash is held at a given temperature is not possible.

In two further proposals which require upward and/or downward travel of the mash, similar disadvantages arise, i.e. the difficulty of employing zones of differing temperature in flexibility in respect of throughput, and general heating difficulties.

The present invention avoids the disadvantages of such prior proposals and provides a simple apparatus wherein the mash is caused to flow in linear fashion by displacement, embodying the principle of first material in, first material out, and wherein each unit of the mash mixture is processed for essentially the same period of time. The processing is carried out in open system which permits venting of undesirable volatile flavouring or aromatic constituents while mashing conditions, such as time and temperature, may be varied independently over a wide range. The equipment readily provides for varying the size of each treatment zone and consequently the hold-up period in each zone without necessarily varying the temperature of the zone, whereas the temperature of any given zone may be varied without changing the hold-up period in that zone. It also permits gentle agitation of the mash in a direction normal to the path of flow to keep it substantially homogeneous in character and which avoids undue break-up of the husk particles of the malt essential for subsequent efficient separation of wort from the spent grain. It has the further advantage that cereal adjuncts of any desired type can be continuously added at any point in the path of flow of the processing mash, and is flexible with respect to throughput volume without any change in the time or temperature program since it may be operated to varied capacity, i.e. two-thirds full, one-half full or one-quarter full, depending upon the requirements of other unit steps in the brewing process with which it is adapted to be linked.

The apparatus provides means for forming a continuously flowing mash producing stream of grist and water, causing said stream to flow in a substantially horizontal path, heating said mixture to predetermined processing temperature, agitating said stream in a direction normal to its path of flow to maintain solids in suspension, venting said stream of undesirable volatiles above said path of flow, and continuously discharging matured mash. Preferably the apparatus allows the mash to be processed along its path of flow in a plurality of series-connected processing zones linearly adjustable for variation of treatment as to control the production of dextrins, fermentable sugars and protein degradation products, coupled with varied temperature treatment as between the zones if and when required to achieve the product desired.

The invention will be clearly understood by reference to the following detailed specification taken in conjunction with the accompanying drawings which illustrate two preferred forms of simple apparatus.

In the drawings:

FIG. 2 is a similar view of an alternative form of apparatus for this purpose; and FIG. 3 shows an alternative disc barrier.

Figure 1:
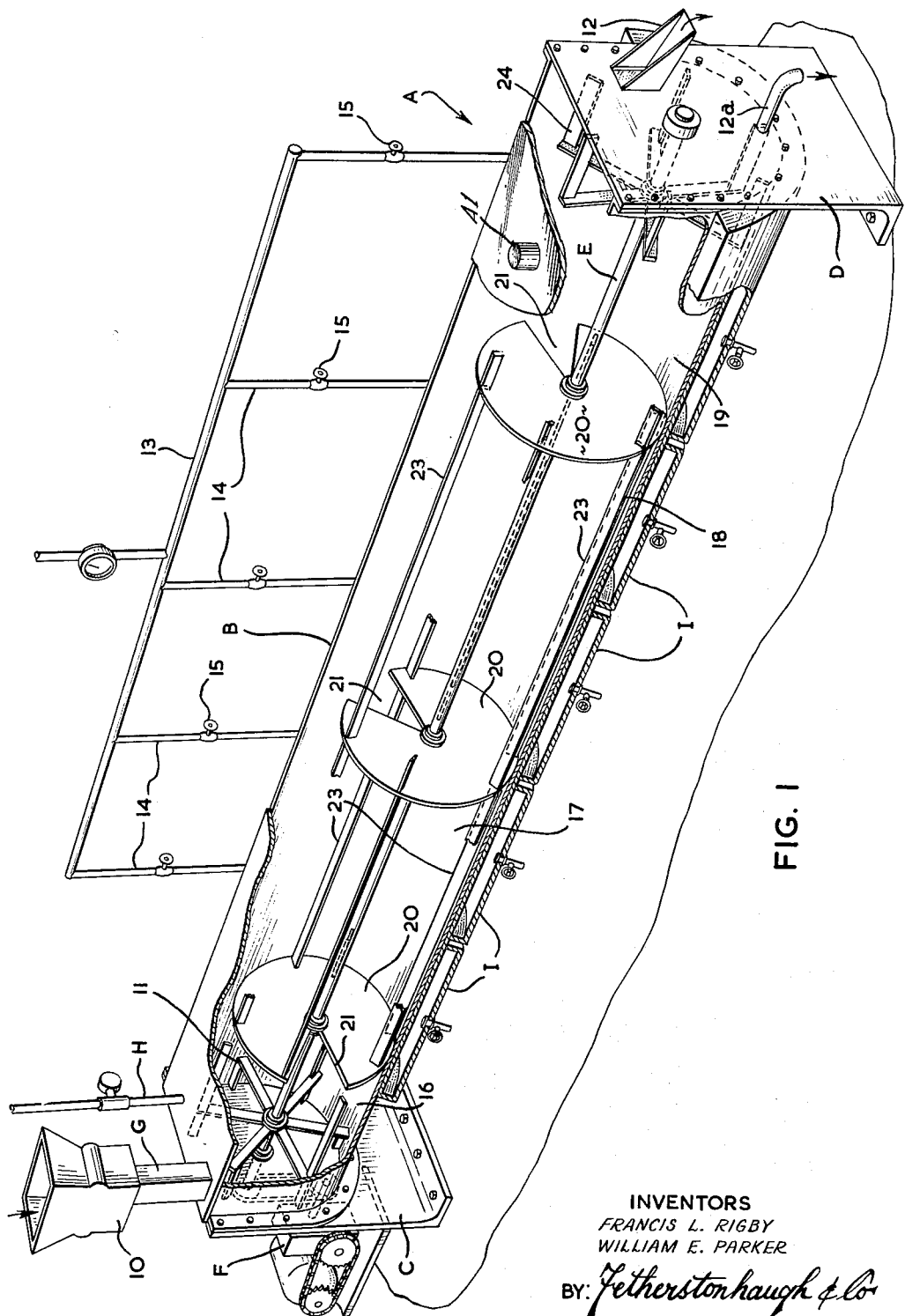
FIG. 1 is a perspective illustration, partly in section, of apparatus of the present invention adapted to carry out the method.

Referring to the drawings, A indicates the apparatus as a whole which is generally comprised by a through-shaped casing B having a rounded bottom supported on suitable standards C and D in which a central rotatable shaft E is journalled for rotation. The shaft E is rotated by a suitable power unit F operatively connected, in known manner, for rotation of the shaft at a predetermined speed. A grist-feeding conduit G supplies grist to the feed end such as from grinder 10 and water is supplied by means of the water inlet H suitably controlled to supply water in desired ratio to grist feed. By means of a suitable rotary mixer 11 carried on shaft E in the feed end of the casing, the grist and water introduced are mixed together as to form a substantially homogeneous mixture and such mixture is fed at a predetermined rate in a substantially horizontal path through the casing and the finally processed mixture is discharged through the mash discharge outlet 12 at the opposite end of the casing. The level of this outlet will obviously control the volume of the mash in the vessel. Outlet 12a is provided for cleaning purposes.

Along the path of flow, the mixture is heated to varying degrees as desired and which may be accomplished by the steam jackets I surrounding the casing to the extent desired and steam is fed by the header 13 by way of branch lines 14, each of which is suitably valve controlled as indicated at 15.

The casing is divided into a plurality of zones such as 16, 17, 18 and 19, divided by the disc dividers 20, and which constitute a plurality of series-connected zones inter-connected by openings such as the sector shaped openings 21 provided in the disc (FIG. 1). Alternatively the communicating openings may be in the form of apertures, such as shown in FIG. 3 and indicated at 22, a series of three such apertures being shown circumferentially spaced apart from one another and such apertures in each disc may be arranged with respect to the adjacent disc in staggered axial relation such as, for instance, the staggered relation of the openings 21 in FIG. 1 as between the several discs employed. The disc divisions forming the several zones act to restrict any substantial linear inter-mixing of mash in different stages of conversion, while permitting a continually controlled flow of mash along its path of flow.

The discs or barriers 20 are designed to be adjustable axially on the shaft E to permit linear adjustment of the zones as may be desired to control the character of the desired final product. For instance, if a higher dextrin content in the mash is required, then zone 18 would be shortened to the desired degree with a corresponding lengthening of zone 19 or conversely where a higher fermentable sugar content was desired, the reverse would be the case. Likewise, where a full-bodied highly foaming product is desired containing more protein degradation products, zone 16 would be lengthened to the desired degree.

Throughout the extent of path of flow, the mixture is maintained substantially homogeneous in character by means of the agitating blades 23 which may extend longitudinally through the discs 20 in circumferentially spaced apart relation and in such a manner that the discs may be adjusted longitudinally on the shaft as previously referred to. In zone 19 at the discharge end of the casing, a further rotary agitator 24 is carried on the shaft to maintain the continuing gentle agitation as to assure discharge of substantially homogenized processed mash so that the ratio, water to solids being discharged, is the same as that achieved in zone 16 and the successive zones 17 and 18. If desired, the edges of the sector-shaped apertures 21 may be slightly offset so that they simulate a cut flight auger insuring that a certain portion of the mash is progressively moved from one zone to another.

Efficiency of the process is essentially unaffected by the ratio of grist to mash water. Grist-water ratios from one to two down to one to four have been employed with no difficulties in operation.

The following comparative analyses for mash from a continuous processing of the present invention as compared with regular batch processing exemplifies results:

*Analyses for mash from continuous mashing apparatus compared with regular batch*

|  | Model 1 | | Model 2 | | Regular Batch |
| --- | --- | --- | --- | --- | --- |
|  | Run 1 | Run 2 | Run 1 | Run 2 |  |
| Malt-Water Ratio by weight | 1:2.76 | 1:3.75 | 1:3.7 | 1:3.7 | 1:3 |
| Throughput, lbs. mash per hr.* | 78 | 119 | 148 | 148 |  |
| Iodine test for conversion | Neg. | Neg. | Neg. | Neg. | Neg. |
| Extract yield % | 71.8 | 71.0 | 73.5 | 72 | 73.5 |
| Sugar in extract % | 73 | 73 | 73.3 | 73.2 | 73 |
| Ratio Fermentable to total carbohydrates | 75 |  | 74.9 | 73.6 | 75 |
| Protein in extract (after boiling) % |  | 5.7 | 6.03 | 6.02 | 6.0 |
| Colour °Lovibond (after boiling) |  |  | 2.8 | 2.9 | 3.5 |
| pH (after boiling) |  |  | 5.1 | 5.1 | 5.1 |

*Not applicable for batch mash.

Reference is now made to the alternative form of apparatus shown in FIG. 2, wherein the drum A1 is constituted as a rotary drum closed by end plates 25 and 26 having the mash inlet 27 at one end fed with grist and water and a mash outlet 28 at the opposite end. The drum contains the agitator assembly comprised by the longitudinal shaft 29, barrier discs 30 having openings 31 as in the case of the structure of FIG. 1, and a series of rakes 32, all designed to rotate with the drum A1 which may be rotated through a suitable chain drive 33 at a speed, not greater than necessary to maintain the solids in suspension. The barrier discs of the agitator assembly are adjustably mounted on the shaft 29 so that the size of the zone therebetween including the end zones may be varied, thereby adjusting the volume of mash in each zone as desired. The drum may be suitably heated by a row of gas jets 34 which are preferably independently regulatable to produce the desired temperature in any zone of the drum.

The rakes 32 act to maintain a substantially homogeneous mixture throughout all zones and additional agitators 35 and 36 are preferably included in the first zone and last zone, respectively, so that the mash is maintained homogeneous and, therefore, the ratio of water to solids being discharged is the same as that entering the drum. The level of the mash in the drum depends upon the size of the opening 28 at the exit which can be varied apertures of different diameters. Alternatively, the level of the mash in the drum may be varied by operating the drum on the slight angle. The drums are suitably vented as at A1 and A'1 so that undesirable volatiles above the path of flow may be discharged. The discs 30 form the zones and restrict any substantial linear inter-mixing of mash in different stages of conversion while permitting a continually controlled movement of mash along its path of flow. Of course, the path of flow does not need to be a path created through one vessel since a plurality of vessels might be used and located at different levels if necessary with a duct in between for transfer of the mash under preparation from one vessel to the other and which vessels would be disposed so that the mash moves in a substantially horizontal path. Accordingly, it is intended that variation of this kind be interpreted as including a continuously flowing mash producing stream which is caused to flow in a substantially horizontal path.

The drum or casing employed is made from any suitable material which will withstand heat and corrosion such as stainless steel, copper, mild steel electro-plated with chromium, nickel or copper, etc. In result, therefore, the apparatus will provide for the continuous conversion of mash under control as to achieve a product of desired character and which may be continuously supplied to other units of a continuous brewing system.

While the invention as described is particularly directed to the processing of brewers' mash, it should be noted that it may also be applied to the preparation of cereal adjunct mash used as an ingredient of brewers' mash. Accordingly, therefore, it is intended that the term "brewers' mash" should be interpreted to include cereal adjunct mash as prepared under varying heat conditions and for use when required as an ingredient of brewers' mash.

What we claim as our invention is:

1. Apparatus for the continuous preparation of brewers' mash comprising an elongated casing having a bottom that is rounded in cross section, a feed inlet at one end of the casing, a discharge outlet at the opposite end of the casing, a central shaft extending longitudinally within the casing, a plurality of divider discs spaced apart on said shaft and having their edges in close contact with the interior of said casing to divide said casing into a plurality of treatment zones, said shaft and said casing being rotatable relative to each other, said discs each having an opening therein, the opening of each disc being staggered in the direction in which said shaft and said casing are relatively rotatable in relation to the opening of an adjacent disc for controlling the passage of grist and water as said shaft and casing are relatively rotated in use to form a mash continuously fed to said casing and caused to flow as a stream in linear fashion by displacement from said feed inlet to said discharge outlet of said casing, means for heating said casing whereby to heat said zones to varying degree, means for venting said casing, and means for agitating said mash as it flows through said casing.

2. Apparatus as claimed in claim 1 in which said shaft and said casing are rotatable relative to each other as aforesaid, said casing being stationary and said shaft being rotatable whereby to rotate said discs and locate an opening of successive discs on said shaft in registry with the flowing stream whereby said stream moves incrementally from one zone to another.

References Cited by the Examiner

UNITED STATES PATENTS

| | | | |
|---|---|---|---|
| 341,801 | 5/86 | Fox | 99—278 |
| 1,283,486 | 11/18 | Fay | 259—81 |
| 2,148,016 | 2/39 | Gale | 195—17 X |
| 2,309,989 | 2/43 | Saltzman | 99—278 |
| 2,513,687 | 7/50 | Strezynski | 99—51 |
| 2,726,957 | 12/55 | Kunz | 99—51 |
| 2,800,786 | 7/57 | Schang | 68—145 |

CHARLES A. WILLMUTH, *Primary Examiner.*

ROBERT E. PULFREY, *Examiner.*